United States Patent [19]

Griesshaber et al.

[11] 4,414,573
[45] Nov. 8, 1983

[54] PATTERN RECOGNITION CIRCUIT FOR RELIABLY DISTINGUISHING BETWEEN DIFFERENT PORTIONS OF A DIASCOPE PATTERN DURING VIDEO CAMERA SETUP

[75] Inventors: Karl H. Griesshaber; Charles A. Bialo, both of San Jose, Calif.

[73] Assignee: Ampex Corporation, Redwood City, Calif.

[21] Appl. No.: 252,108

[22] Filed: Apr. 8, 1981

[51] Int. Cl.³ .................... H04N 9/62; G06K 9/00
[52] U.S. Cl. ............................... 358/163; 358/10; 358/139; 382/48; 382/61
[58] Field of Search ............ 340/146.3 AH, 146.3 H; 364/515; 358/10, 37, 139, 160, 163, 166; 315/370; 235/92 PC; 382/48, 61

[56] References Cited

U.S. PATENT DOCUMENTS

| | | | |
|---|---|---|---|
| 3,732,366 | 5/1973 | Bolie | 340/146.3 AH |
| 4,115,804 | 9/1978 | Morton et al. | 235/92 PC |
| 4,234,890 | 11/1980 | Astle et al. | 358/163 |
| 4,285,004 | 8/1981 | Morrison et al. | 358/163 |
| 4,326,219 | 4/1982 | Griesshaber | 358/163 |
| 4,354,243 | 10/1982 | Ryan et al. | 358/163 |

Primary Examiner—Leo H. Boudreau
Attorney, Agent, or Firm—George B. Almeida; Joel D. Talcott

[57] ABSTRACT

A pattern recognition circuit integral with a checkerboard diascope pattern used for spatial and shading error measurement and correction, performs detection in the time domain. A locator time window is provided to positively locate and distinguish white-to-black transitions of coarse locators selectively placed within the diascope pattern from, for example, checker white-to-black transitions, or from white-to-grey transitions, even under adverse scanning conditions. The circuit includes narrow time windows for identifying specific valid locator transitions, to thereby prevent triggering due to checker transitions, short noise pulses, etc. During one field interval, each locator is scanned a number of lines, but only the middle line scan is used to describe the locator coordinates, i.e., is used to generate a locator strobe output for latching the coarse locator positions into a system memory for subsequent comparison with the diascope pattern to determine the coarse scan errors. Checker transitions are indicated via a checkers valid output which remains in a high logic state as long as checkers are being scanned.

10 Claims, 5 Drawing Figures

FIG.1

FIG_3A

FIG. 3B

PATTERN RECOGNITION CIRCUIT FOR RELIABLY DISTINGUISHING BETWEEN DIFFERENT PORTIONS OF A DIASCOPE PATTERN DURING VIDEO CAMERA SETUP

CROSS REFERENCE TO RELATED APPLICATIONS

Digital Error Measuring Circuit For Shading And Registration Errors In Television Cameras, U.S. Pat. No. 4,326,219, filed Apr. 11, 1980, to Karl H. Griesshaber.

A Two-dimensional Interpolation Circuit For Spatial And Shading Error Corrector Systems, U.S. Pat. No. 4,354,243, filed Apr. 11, 1980, to John O. Ryan, et al.

Digital Measurement System For Automatically Focusing A T.V. Camera, U.S. Pat. No. 4,325,082, filed Aug. 11, 1980, to Karl H. Griesshaber.

BACKGROUND OF THE INVENTION

The invention relates to television camera automatic setup systems, and particularly to a pattern recognition circuit integral with an error measurement system, for reliably distinguishing between three possible pattern configurations within a diascope pattern, one example being the spatial location of nine white-to-black coarse locator configurations.

Automatic setup systems such as that of the U.S. Pat. No. 4,326,219 of previous mention, include means for performing spatial, shading, beam level, focus, etc., error measurements on the scan raster of pickup tubes in a television camera. To make such measurements it is necessary to identify the location of the scanning beam on the test pattern, that is, to assure that a specific portion of the test pattern is being scanned for each given error measurement. For example, when making coarse spatial error measurements, the above prior art system used a series (i.e., five) coarse registration locator rectangles placed at the center, at the top and bottom, and at either side, of the conventional optical test pattern, i.e., the diascope pattern, within the active video picture area. A locator detector circuit thereof includes detection and timing circuits and, inter alia, makes a coarse comparison of the locator positions in the diascope pattern relative to an electronic test pattern, to correct for gross centering, size and rotation scan errors. In addition, the system provides an output indicative of the detection of the checker transitions during the valid scanning by the beam of a selected block of checkers. The locator detector circuit supplies any errors detected during the setup mode to a memory of the camera control unit microprocessor via a data bus. Coarse scan corrections are then performed during the camera operating mode by a digital to analog converter and/or spatial error correction (SEC) circuitry such as depicted in the U.S. Pat. No. 4,354,243, upon retrieving the errors from the memory.

Such a pattern recognition and error detection system operates in the frequency domain utilizing the relatively larger size of the coarse locators relative to the checkers, i.e., four to one, as a basis for distinguishing the different pattern configuration. The use of the size ratio as the criterion to detect the locators via filtering and level detecting techniques in the frequency domain, does not prove reliable under adverse scanning conditions. For example, in the prior system, the coarse locator provides the locator strobe signal which is used to latch the coarse error into the system memory. It follows that in adverse setup conditions, when the beam scans at a greater angle due to picture skew, etc. in the region of the last locator, the circuit sometimes generates an erroneous locator strobe pulse from a white-to-grey transition rather than from the white-to-black transition. Detecting such a white-to-grey transition is possible if the beam scans from the white portion of a locator to the grey band area of the test pattern used for gamma correction. Thus, the pattern recognition and error measurement technique of the prior art provides marginal reliability, unless undesirable elaborate filtering techniques are utilized.

SUMMARY OF THE INVENTION

The present pattern recognition overcomes the shortcomings of the prior art by providing means for reliably detecting, and thus distinguishing between the three pattern contents of the optical test pattern, i.e., the bands of white-to-black checkers, the white-to-black coarse locators, and the grey band areas between the checker bands. The circuit operates in the time domain rather than in the frequency domain, to provide a coarse locator strobe output of specific interest herein which is used to determine the coarse spatial errors, while also providing focus valid and checker valid output signals to determine the scan location when making focus, level and fine spatial error measurements.

To this end, the video signal generated during the setup mode, when the beam of a pickup tube is scanning the optical test pattern, generates a negative threshold via a negative peak detector which threshold tracks the negative level of the input video. A positive threshold generates a time window pulse of a length greater than one checker, and the pulse is subtracted from the former waveform to eliminate trigger action from checkers or short noise pulses. The leading edge of the difference pulse generates a time window which determines the maximum time allowed for the trailing edge of the pulse to occur. The trailing edge thereof sets a very narrow time-slot within which the white-to-black locator transition must occur. The crossings generate a selected succession of locator strobes which generally indicate coarse locator locations.

A select one of the succession of locator strobes generated by the threshold circuitry is detected by a digital, strobe qualifier circuit which is triggered in response to horizontal and vertical addresses corresponding to the locations of each of the spaced coarse locators. By way of example, the qualifier circuit herein triggers on a second, or center, locator strobe received from the threshold circuitry, in a respective coarse locator window which limits the occurrence of valid locator strobes of each of the locators to respective locator coordinates corresponding to the assigned addresses. The resulting qualified locator strobe gates a latch in the system interface circuitry, to store, for example, the coarse error data for subsequent use as described in the U.S. Pat. No. 4,326,219 of previous mention.

The input video also is supplied to positive and negative threshold comparators whose outputs are combined and used to control a flip-flop. The flip-flop remains set as long as the camera scans bands of checkers. If checkers are not present or only partly present during the duration of a block, the flip-flop is reset. The output state of the flip-flop is used to distinguish that checkers are being scanned.

BRIEF DESCRIPTION OF THE PREFERRED EMBODIMENTS

Figure 1:
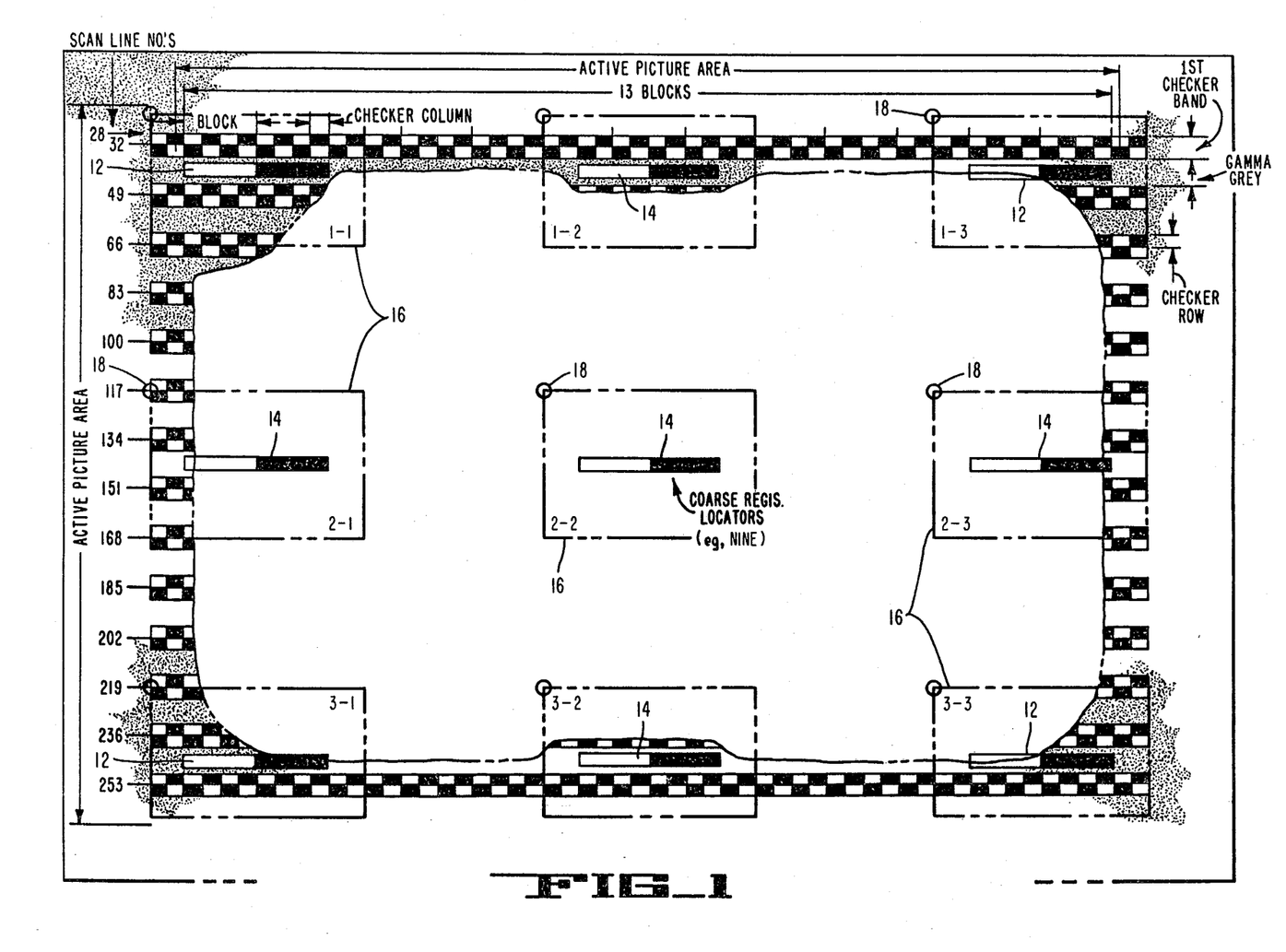
FIG. 1 is a plan of an optical test pattern used to perform the various error measurements, and thus corrections, of a television camera during the setup mode.

FIG. 1 depicts an optical test pattern, otherwise known in the art as a diascope pattern, which is used to perform automatic or manual, spatial, shading, focus, etc., error measurements of a television camera during the camera setup mode. The test pattern is essentially the same as that of FIG. 2 of the U.S. Pat. No. 4,326,219 of previous mention, and the use thereof in performing the error measurement process is described more fully therein, as well as depicted via the block diagram of FIG. 2 herein. The test pattern of FIG. 1 herein is modified to include additional white-to-black coarse locators 12 at each corner of the pattern in combination with the locators 14 of previous use, wherein all locators are disposed within the active picture area. The pattern further depicts respective time windows 16, shown in phantom line, around each of the coarse locators 12, 14. To simplify the description, the locators are identified hereinafter by addresses 1-1 for the top left locator, 1-2 for the top mid locator, 1-3 for the top right locator. The middle row includes locators 2-1, 2-2 and 2-3, while the bottom row locators are identified as 3-1, 3-2 and 3-3. A pseudo locator signal is generated at the upper left corner of each locator window 16, as depicted by the small circles 18, which signal triggers the system interface circuit (FIG. 2) to store a preselected fixed number in the interface circuit memory. This dummy number is recognized by the system microprocessor (FIG. 2) as an indication of a fault condition, unless it is overwritten by a following qualified locator strobe output, as further described below. In one field of a NTSC 525 line standard television system each locator is scanned at least five times, while in a 625, e.g., PAL system, the locators are scanned six times.

Figure 2:
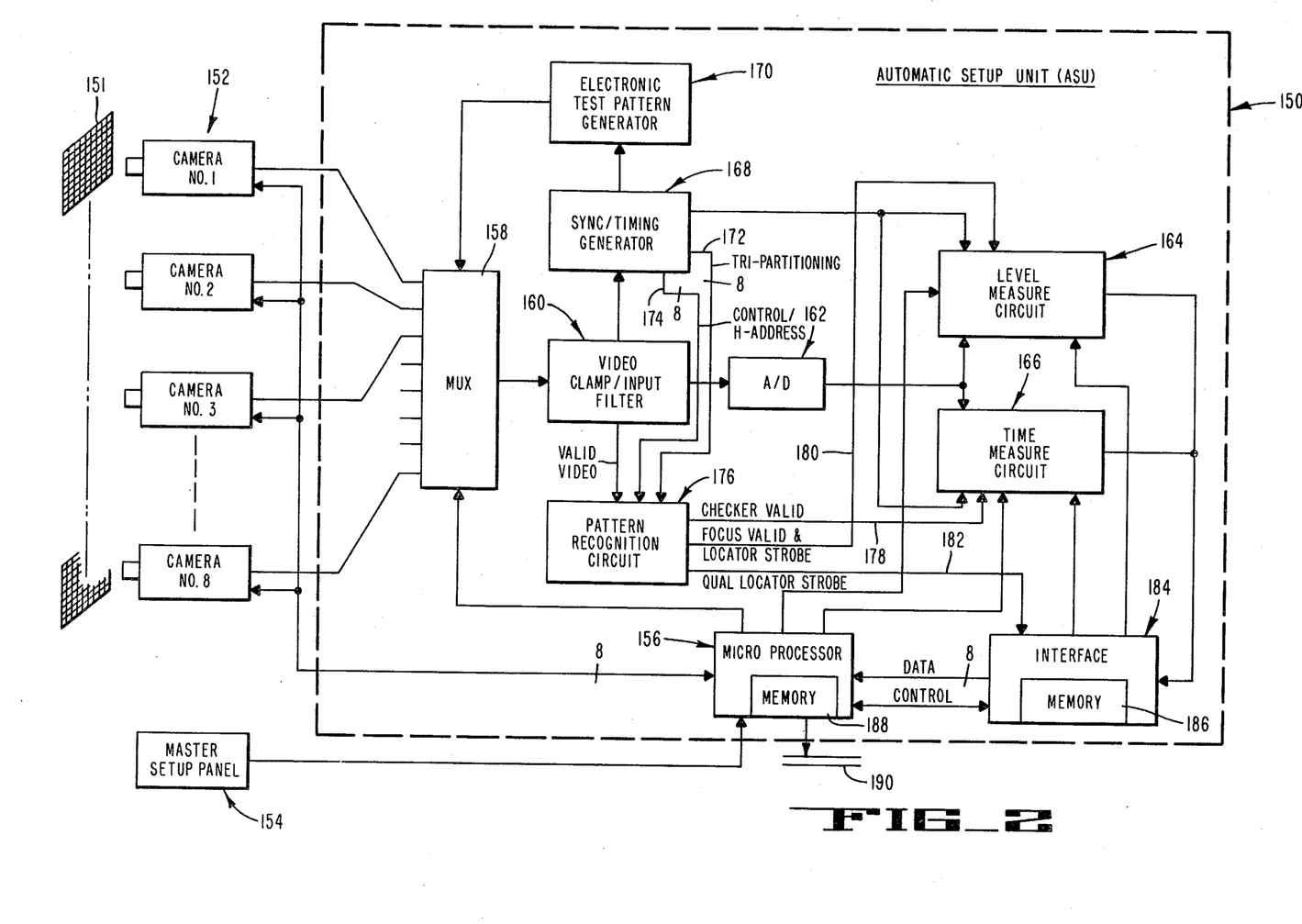
FIG. 2 is a block diagram of an automatic setup unit of a television camera employing inter alia the circuit of FIGS. 3A, 3B.

Accordingly, FIG. 2 depicts an automatic setup unit (ASU) 150 disposed to receive television signals from a selected one of a plurality of television cameras 152, herein depicted as cameras numbered 1 through 8 disposed to view an external or internal optical test pattern (e.g., diascope) 151. A master setup panel (MSP) 154 is also coupled to the ASU 150 and provides conventional operator-related input commands to microprocessor means 156 thereof for selecting the desired camera, setup procedure, operating mode, etc. The cameras 152 are coupled to the ASU 150 via a multiplexer 158, which feeds a selected video signal to a video clamp input filter circuit 160 in response to direction by the microprocessor means 156. The circuit 160 supplies the video signal to an A/D converter 162 which feeds the digitized video to level and time measurement circuits 164, 166 respectively. The clamp/filter circuit 160 also supplies selected video signal to a sync/timing generator 168, which supplies various horizontal (H) and vertical (V) timing signals to an electronic test pattern generator 170 and to the measurement circuits 164, 166, as well as a tri-partitioning and various other control signals via a bus 172 and lines 174. The test pattern generator 170 supplies an electronic test pattern (ETP) signal to the multiplexer 158 which is subsequently used for comparison with the optical test pattern 151 in the ASU circuitry to provide the subsequently generated spatial, shading, focus, etc., error corrections during the camera operating mode.

The clamp/filter circuit 160 further supplies a selected video-related signal to a pattern recognition circuit 176, which also receives the tri-partitioning and control signals on bus 172 and lines 174 respectively from the sync/timing generator 168. The pattern recognition circuit 176 of FIG. 2 corresponds to the circuit of the invention further described below with reference to FIGS. 3A, 3B herein. Thus, circuit 176 provides various signals indicative of the various pattern configurations within the diascope pattern 151 as the latter is scanned by the electron beam during the setup process. To this end, the pattern recognition circuit 176 supplies a checker valid output via a line 178 to the time measurement circuit 166, focus valid and locator strobe outputs via lines 180 to the level measurement circuit 164, and a qualified locator strobe output via a line 182 to interface means 184, in response to the controls thereto on inputs 172, 174.

The outputs of the measurement circuits 164, 166 corresponding to the various digitized error measurements, are fed to an intermediate interface memory 186 of the interface means 184, whereby the data thence are supplied to a processor memory 188 as directed by the microprocessor means 156. The error data is then available from memory 188 via a systems data bus 190 for supply to the D/A converter and/or SEC circuitry (not shown) for subsequent use in performing the error corrections during the camera operating mode, as described in the prior U.S. Pat. No. 4,354,243 of previous mention.

The combination of the block diagram of FIG. 2 is analogous to that described in the U.S. Pat. No. 4,326,219, and readily may be compared to FIG. 1 of the latter application, whereby the arrangement of the instant pattern recognition circuit within the camera system, viz, within the ASU, readily is apparent.

Figure 3A:
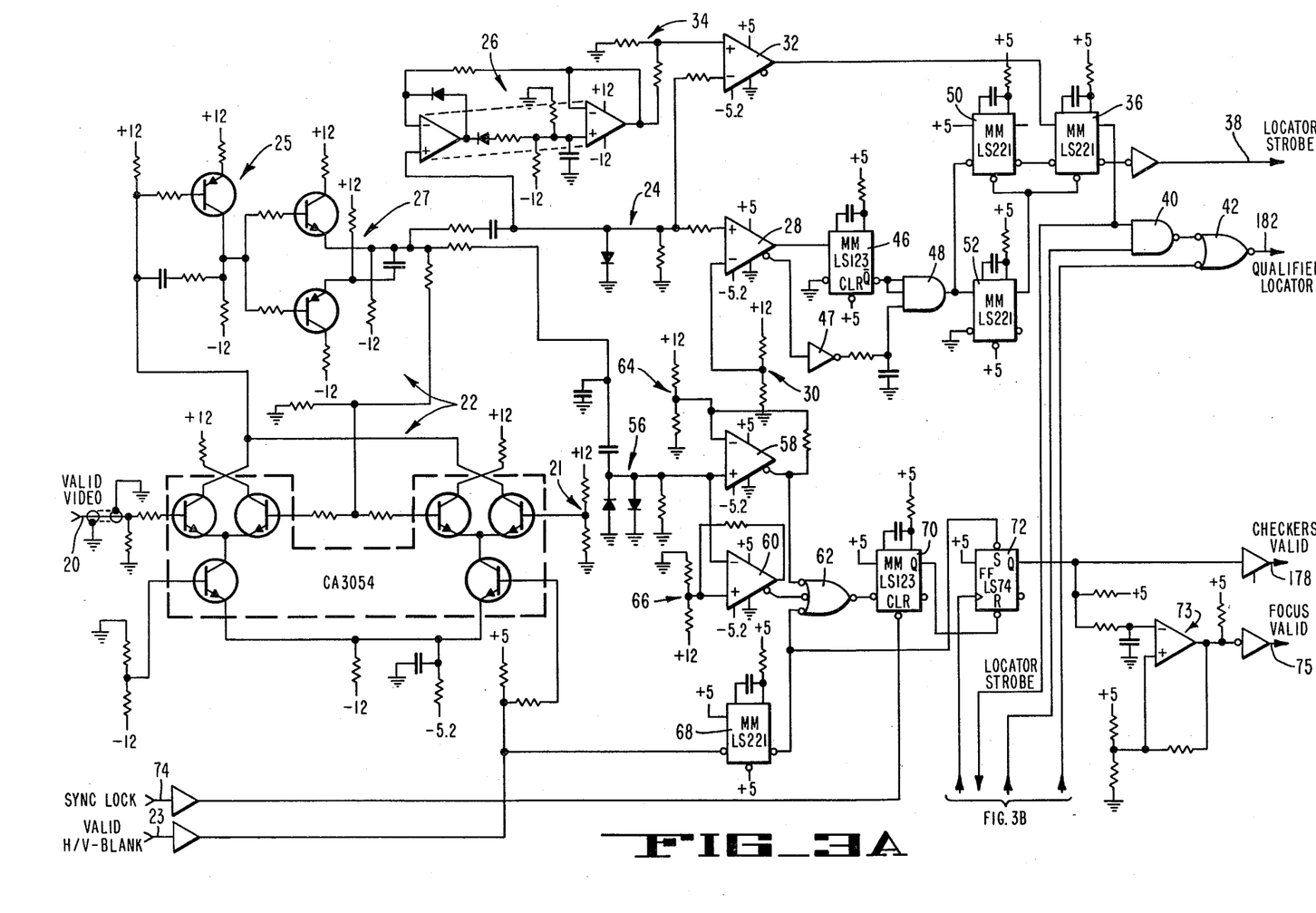
FIGS. 3A, 3B are a schematic diagram of one implementation of the invention combination.
Figure 3B:
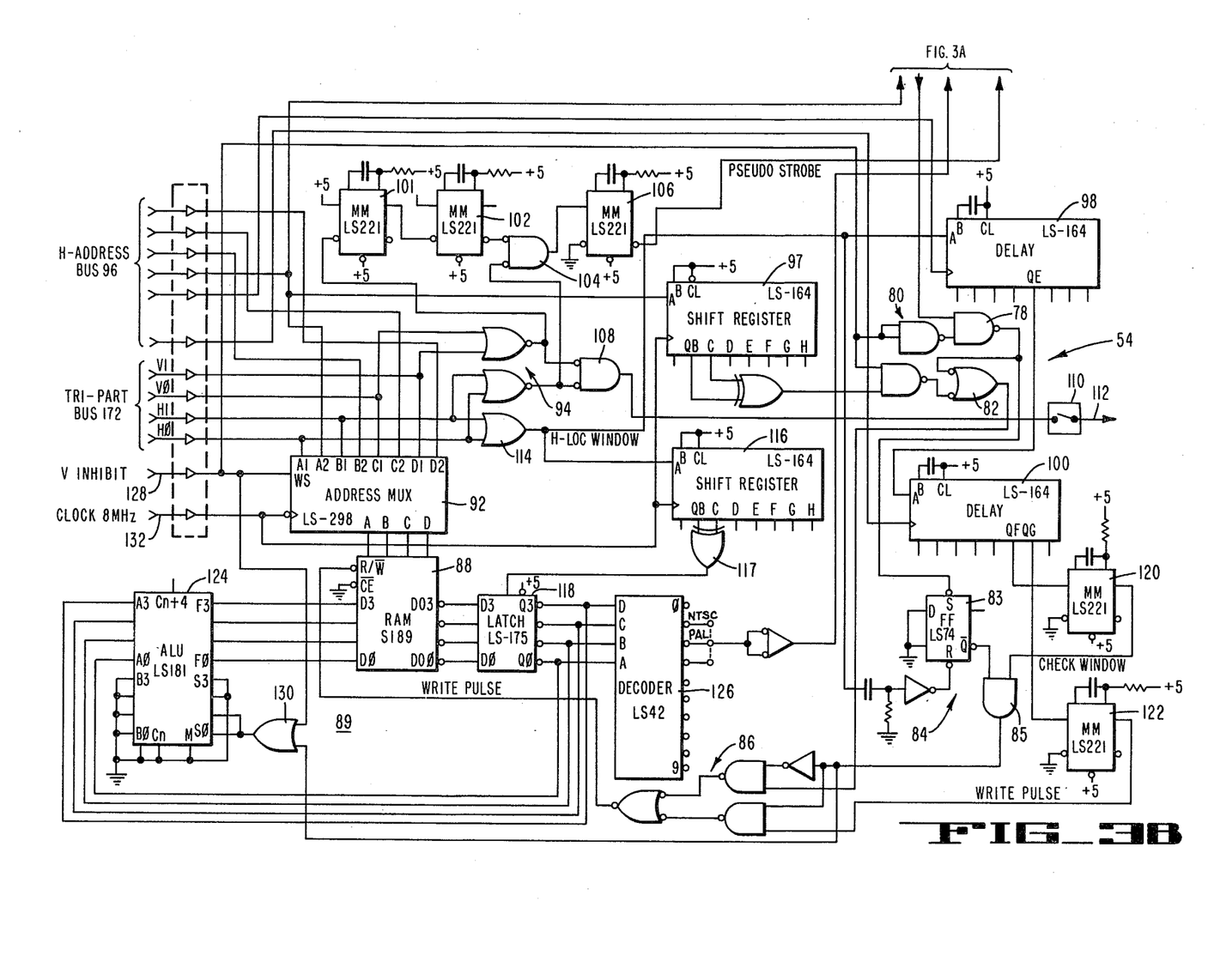

Referring to FIGS. 3A, 3B, an implementation of the pattern recognition circuit 176 of FIG. 2 is depicted in schematic. A video signal generated by a selected television camera 152 of FIG. 2, while scanning the optical test pattern 151 during the setup mode, is applied via the multiplexer and a line 20 to input switch means defined by an amplifier/clamp 22. The latter is an amplifier which switches between the input line 20 and a fixed clamping potential of a voltage divider 21 in response to a validation blanking signal on a line 23 corresponding to the system's conventional horizontal and vertical blanking signals. The amplifier/clamp 22 includes a gain stage 25 which provides the required voltage swing to operate the following limiting diodes. Thus the amplifier/clamp 22 drives a diode clamp 24 and a negative peak detector 26 via a suitable buffer 27. The diode clamp 24 clamps the positive excursion of the video signal at one diode drop above ground, e.g., +0.7 volt. The clamp is coupled to a positive threshold comparator 28, which is set at a fixed threshold level, e.g., +0.3 volt, via a voltage divider 30. The negative peak detector 26 is coupled to a negative threshold comparator 32 via a voltage divider 34, whereby a negative threshold level is provided which tracks the video signal amplitude. The negative threshold comparator 32 is coupled to the input of a monostable multivibrator which defines an output pulse former 36. The not-true output of the latter provides a continuous locator strobe output via a line 38, which output corresponds to the output lines 180 of FIG. 2 and which thus is fed to the ASU measurement circuit 164 and thence to the system interface means 184. The true output of pulse former 36 supplies a locator strobe output to a qualify NAND gate 40, whose output is fed to a NOR gate 42. The latter provides a selected center line scan, i.e., a qualified locator strobe output via the line 182 of FIG. 2, as further described below, which latches the count in the microprocessor memory 188 system counters in the manner of the locator strobe signal on line 214 of FIG. 9 in the U.S. Pat. No. 4,326,219.

The output of the positive threshold comparator 28 is coupled to a retriggerable one-shot multivibrator 46, and thence to an AND gate which acts as a subtractor 48. The strobe output of comparator 28 is coupled via an inverter 47 directly to the subtractor 48. The one-shot 46 has a duration of more than one checker time length, i.e., more than one microsecond (1 $\mu$s) (see FIG. 1). The pulse from the one-shot 46 is subtracted from the originating pulse from the comparator 28 via the subtractor 48, and the difference pulse is fed to a pair of monostable multivibrators 50, 52, which generate a negative and a positive threshold window respectively. The output of the monostable 52 is coupled to the clear inputs of the monostable 50 and the output pulse former 36. The positive threshold window generated by the multivibrator 52 is triggered by the leading edge of the difference pulse and determines the maximum time allowed for the trailing edge to follow, e.g., 3.4 $\mu$s. The negative threshold window generated by the multivibrator 50 is triggered by the trailing edge of the difference pulse and sets a very narrow time slot, e.g., 0.5 $\mu$s, within which the negative threshold crossing, i.e., the coarse locator white-to-black transition, must occur. The crossing generates the locator strobes of previous mention via the output pulse former 36.

In addition to the generation of coarse locator strobes for locator detection, the circuit of FIG. 3A includes improved circuitry which operates in the time rather than frequency domain, and which detects blocks of checkers within the bands of checkers of the optical test pattern 151. The circuitry replaces the circuit of similar function in FIGS. 1 and 9 of the U.S. Pat. No. 4,326,219. To this end, the video signal amplified via the input amplifier/clamp 22, is fed to a limiter circuit 56 which performs a clamping action. The output is coupled to positive and negative threshold comparators 58, 60 respectively, and thence to a NOR gate 62. The thresholds are determined by respective voltage dividers 64, 66. A third input to NOR gate 62 is supplied via a line initiation monostable multivibrator 68 coupled in turn to the validation H/V blanking signal on the line 23. The NOR gate 62 is coupled to a retriggerable one-shot flip-flop 70, whose true output is coupled to the reset of a RS flip-flop output latch 72, and whose clear input is coupled to a system sync lock signal on a line 74. The sync lock signal insures that the circuit timing is locked to that of the specific camera 152 being setup. The set input of output latch 72 is coupled to the output of the multivibrator 68. The output latch 72 is clocked via the relatively high frequency 4-bit from an H address bus,
FIG. 3B, further described below. The output line 178 from the latch 72 provides the checker valid signal as long as the camera scans a band of checkers. The checker valid signal corresponds to the pattern validation output on line 43 of the pattern validation circuit 24, FIGS. 1 and 9 of the U.S. Pat. No. 4,326,219.

The output latch 72 is set at the start of each block of checkers via the 4-bit of the H address of previous mention, and remains set if checkers are being scanned. If checkers are not present, or only partially present, during the duration of a block, the one-shot 70 goes low and resets the latch 72. To insure proper operation, the one-shot 70 is cleared via the sync lock line 74, and the latch 72 is set at the beginning of each active video line via the line initiation multivibrator 68 and the H/V blanking on line 23. When no checkers are present during a line scan, the one-shot 70 is not retriggered and the latch 72 is reset before the valid state on the line 178 is investigated via the time measurement circuit 166. The checkers valid output of the latch 72 is buffered and fed to the ASU measurement circuit 166, thence to the interface memory 186, etc., as in FIG. 2. Latch 72 is also coupled to a simple lowpass filter and thence to an amplifier integrating circuit 73, which provides the focus valid output signal on a line 75 analogous to the lines 180 of FIG. 2, for subsequent use in the system to correct for focus as described in the U.S. Pat. No. 4,325,082 of previous mention.

During one field interval, each coarse locator is scanned five times in an NTSC, 525 line, television standard, but only one locator strobe, i.e., the one generated by the second successive valid line scan, is used to define the white-to-black transition corresponding to the respective locator coordinates. For this reason, the valid occurrence of the locator strobes is limited to respective specified regions, i.e., locator windows 1-1 through 3-3 around each locator (FIG. 1). If during one field a locator transition is detected within its respective window during each of two successive line scans, then the qualify NAND gate 40 is enabled in the center line scan, allowing the anticipated center locator strobe to pass gate 40 as the qualified locator strobe, which is used to trigger the system latches to which line 182 is coupled. If the center locator strobe does not occur within its respective window in the following line scan, a pulse is generated via a digital strobe qualifier circuit 54, shown in FIG. 3B, which cancels the effect of the previously generated pair of locator strobes. Thus it follows that in a NTSC system a successive sequence of two valid locator strobes must be detected, independently within each respective window, before a locator strobe is qualified and a valid locator strobe output for that locator is generated on the line 182.

To this end, in FIG. 3B, the locator strobe output fed to the qualify NAND gate 40, is also fed to the digital strobe qualifier circuit 554, and particularly to a NAND gate 78 of a strobe gate array 80. The NAND gate 78 is coupled to a NOR gate 82 and also to the set input of a a D-type flip-flop 83 which together with an AND gate 85, define a strobe status latch 84. NOR gate 82 is coupled to a write pulse gate 86, which also is coupled to the output of the AND gate 85 of strobe status latch 84. The output of write pulse gate 86 is fed to the read/write input of a randon access memory (RAM) 88 of a successive strobe detector loop 89.

The strobe qualifier circuit 54 is generally triggered for each of the nine coarse locators by an assigned address on the tri-partitioning bus 172 of previous mention, consisting of a pair of vertical (V) and a pair of horizontal (H) address inputs. The bus 172 is coupled to the inputs of an address multiplexer 92, as well as to a pair of NOR gates 94. An H address bus 96 comprising an 8-bit word corresponding to the system H address and shown in FIG. 2 as line 174, has the four least significant bits coupled to the address multiplexer 92. The 4-bit thereof clocks the output latch 72 of FIG. 3A, and also is fed to the input of a shift register which defines a write pulse former 97. The 3-bit and zero-bit inputs are coupled to the clock inputs of a pair of delays 98, 100, respectively.

The NOR gates 94 are coupled to a monostable multivibrator 101 and to an AND gate 104 respectively. The monostable 101 is coupled to another monostable 102, and thence to the AND gate 104. The latter is coupled to another multivibrator 106. The latter supplies the pseudo locator strobe corresponding to the top left corner 18 of each of the locator windows (FIG. 1), which pseudo locator strobe is fed to the second input of the NOR gate 42 of FIG. 3A, and which provides the selected fixed number of previous mention to the system memory which identifies the corner 18 of each locator window. In the event the selected successive valid locator strobes are not generated, the pseudo number indicates such a condition. The NOR gates 94 also are coupled to a NAND gate 108 which provides a visible locator window output which is supplied to a suitable monitor (not shown) via a switch 110 and line 112.

An OR gate 114 is fed by the H address inputs of bus 172 and thence supplies a reset pulse corresponding to the beginning of the locator window to the input of a shift register 116. The latter's output is coupled via an exclusive OR gate 117 to a RAM latch 118 of the successive strobe detector loop 89. The OR gate 114 output is also coupled to the reset input of the strobe status latch 84 and to the input of the delay 98. The delay 98 is coupled to the second delay 100, which supplies outputs to a check window monostable multivibrator 120 and to a write pulse monostable multivibrator 122. The output of multivibrator 120 is fed to the AND gate of the strobe status latch 84, and that of multivibrator 122 is fed to a third input of the write pulse gate 86.

The output of RAM 88 is coupled to the RAM latch 118, whose output is coupled back to the input of an arithmetic logic unit (ALU) 124 as well as to a decoder 126. The output of ALU 124 is coupled to the inputs of RAM 88. The decoder 126 output is fed to the second input of the qualify NAND gate 40 via an inverter. The components 88, 118, 126 and 124 define the successive strobe detector loop 89 of previous mention and provide the means for detecting a selected number of successive valid locator strobes and thus the selected center scan strobe for a specific coarse locator.

A V-inhibit signal corresponding to the system V-blanking signal, is fed from a line 128 to the word select input of the address multiplexer 92, to one input of the strobe gate array 80, and to one input of an OR gate 130. The other input to OR gate 130 is from the AND gate 85 of strobe status latch 84, where gate 130 is then coupled to a control input of the ALU 124. An 8 MegaHertz system clock is fed via line 132 to the clock inputs of the multiplexer 92 and of the shift registers 97, 116.

Figure 4:
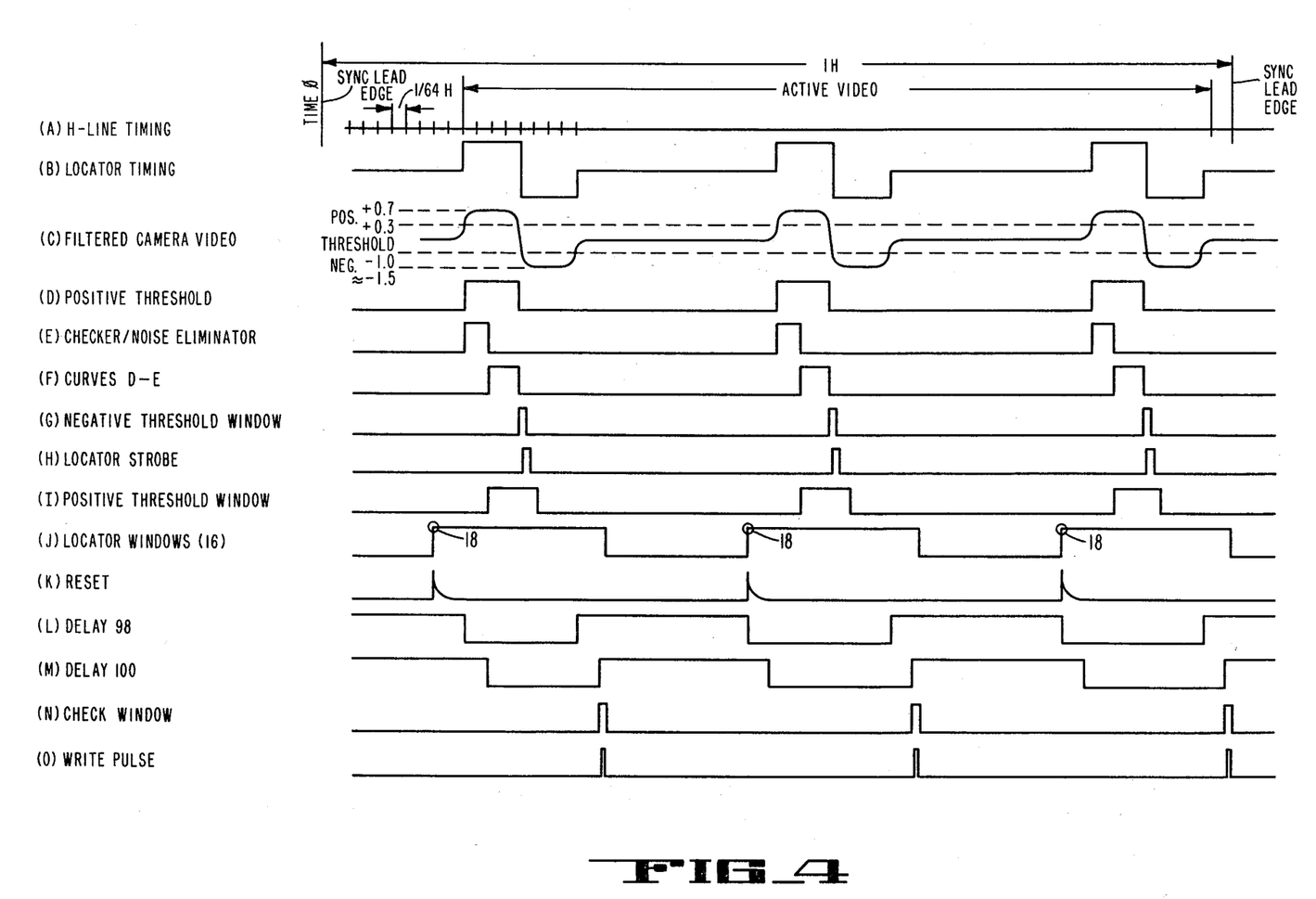
FIGS. 4A–4O are a series of graphs depicting various signal and timing waveforms associated with the circuitry of FIGS. 3A, 3B.

Referring to FIGS. 3A-3B and 4A-4O, during the setup mode a camera 152 scans the optical test pattern 151 of FIG. 1, wherein each row of coarse locators 1-1 through 3-3 are represented by the waveform of FIG. 4B. For example, a line scan through locators 1-1, 1-2 and 1-3 is depicted wherein the three successive negative-going excursions of FIG. 4B correspond to the white-to-black transitions of the successive locators 1-1, 1-2 and 1-3 of FIG. 1. The waveform of FIG. 4C depicts the filtered camera video signal with which the input amplifier 22 drives the diode clamp 24 and negative peak detector 26. The diode clamp sets the positive excursion of the video signal at one diode drop, i.e., 0.7 volt above ground. The positive threshold is a fixed level of +0.3 volt and the negative threshold is derived via the negative peak detector 26 and tracks the signal amplitude. The output of the positive threshold comparator 28 (FIG. 4D) triggers the one-shot multivibrator 46, which has a duration of more than one checker, e.g., 1.6 µs (FIG. 4E). This pulse is subtracted from the originating pulse (FIG. 4D) via the subtractor 48 and provides the difference pulses of the waveform in FIG. 4F, whereby erroneous triggers from the checkers or short noise pulses are eliminated.

The difference pulse is used to generate two time windows. The window triggered by the leading edge of the FIG. 4F pulse and generated by the multivibrator 52, determines the maximum time allowed within which the trailing edge must occur (FIG. 4I). The window triggered by the trailing edge of the pulse, and generated by the multivibrator 50, sets a time-slot (FIG. 4G) within which the negative threshold crossing (FIG. 4C), i.e., the white-to-black transition, must occur. A valid crossing then is used via the output pulse former 36 to generate the locator strobe, FIG. 4H. The selected succession of locator strobes are supplied on output line 38, as well as fed to the digital strobe qualifier circuit 54.

The circuit 54 is used to determine if the required number of valid locator strobes have occurred, and particularly to determine the valid occurrence of the selected center locator strobe. The circuit 54 basically is triggered in response to the assigned addresses of each of the nine coarse locators, provided via the tri-partitioning bus 172 and the line 174 of the sync/timing generator 168 of FIG. 2.

The V-inhibit (i.e, V-blanking) at line 128, resets the RAM 88 by setting the ALU 124 to an output function equal to zero via OR gate 130. During the vertical interval, the H-address bus 96 also supplies a high frequency address change to the address multiplexer 92, and provides a write pulse via the write pulse former register 97, to thus clear all locations in the RAM by writing zeros therein. To this end, the 4-bit of the H-address bus 96 is fed to the shift register 97, which delays the pulse in response to the clock on line 132. The delayed outputs of the shift register 97 are fed to the strobe gate array 80 along with the V-inhibit signal. Array 80 then enables the NOR gate 82 which, in turn, enables the generation of the write pulse via the write pulse gate 86. Thus it may be seen that in the V interval, NOR gate 82 is enabled via the shift register 97, and after the V interval, is fed the locator strobe from the pulse former 36 via the NAND gate 78.

After the occurrence of the V blanking interval, i.e., the V-inhibit signal on line 128, zeros have been written into the RAM 88, and the first address, i.e., locator 1-1, appears at the address multiplexer 92. The corresponding first locator strobe is fed to the strobe gate array 80 which, in turn, is fed via the NOR gate 82 to the write pulse gate 86. The strobe also sets the strobe status latch 84, which is used to detect if a valid locator strobe has been present during a prior line scan for that address. If a valid strobe is present, the write pulse gate 86 writes a "1" into the RAM 88 address, which loads the RAM at that particular address by way of the address multiplexer 92. If the next line scanned produces a valid locator strobe, the "1" in the RAM is read into the RAM latch 118, the ALU 124 is incremented by the incoming "1" of the second line, and a binary 2 is written in the RAM 88 address. The ALU 124 is programmed by the strobe status latch 84 or the V-inhibit line 128, via the OR gate 130, to either a function F+1 if the latch 84 is set by a valid strobe, and to a function of zero if the latch is not set, i.e., if a valid strobe is not present during a specific scan. Thus the loop 89 looks at the contents of the prior line, and reads the contents into the RAM latch 118 at the beginning of the specific locator address. In the 525 line NTSC television standard system, the second valid scan is selected as the center scan, so the decoder 126 is set to detect line number two. In the PAL system the third valid scan is the center scan. Thus in NTSC, when the second line is scanned and a valid center locator strobe is received, the strobe status latch 84 remains set and the center locator strobe is qualified, that is, is passed via the qualify gate 40 to the output line 182.

To this end, the waveform representing a row of locator windows of FIG. 1 during corresponding line scans within the windows, is shown in FIG. 4J, and is generated by the system sync/timing generator 168, FIG. 2. At the time of the leading edge of the locator window, a reset pulse (FIG. 4K) is provided via the tri-partitioning H addresses on bus 172 to the strobe status latch 84, to reset the latter to allow detection of the corresponding locator strobe. The reset pulse also initiates a delay via the delay 98 (FIG. 4L) and a second delay via the delay 100 (FIG. 4M) which generates thus a sync pulse of constant width which is locked to the system clock of the specific camera. The trailing edge of the second delay enables the multivibrator 120 to generate the check window pulse of FIG. 4N, which allows the circuit to investigate the status latch 84 at the end of the locator window to see if a strobe was present. If a strobe was present, the strobe status latch 84 remains set, the ALU 124 is incremented via AND gate 85 and OR gate 130, the multivibrator 122 enables the write pulse gate 86, and the write pulse of FIG. 40 writes a "1" into the respective RAM 88 address. If a locator strobe is not present during the window, zeros are written into the respective RAM address via the latch 84, the OR gate 130 and the ALU 124, indicating that no valid locator strobe was present during the scan of that particular locator window. Thus the circuit provides noise imunity to inhibit irregular noise pulses.

If no locator strobes are qualified during a locator window, the microprocessor 156, FIG. 2, must be informed. Thus the pseudo strobe is supplied via the tri-partitioning bus 172, the gates 94, 104, and the multivibrators 101, 102 and 106, at the top left geometric corner 18 of each respective window. The pseudo strobe is fed to the memory 186 in the interface means 184. If a qualified locator strobe subsequently is not written over the pseudo strobes at the respective addresses, the microprocessor 156 readily detects the corresponding pseudo word and generates a suitable output indicating such a condition to the operator.

What is claimed is:

1. A pattern recognition circuit for distinguishing between given pattern configurations of an optical test pattern as the latter is being scanned by a beam on successive lines of a corresponding video field during automatic television camera setup, the pattern configurations including spaced white-to-black coarse locators having white-to-black transitions and bands of white-to-black checker blocks, comprising;
   strobe circuit means for generating a succession of continuous locator strobes within one field which are indicative of each locator's white-to-black transition in successive lines of the respective coarse locators within the field; and
   qualifying circuit means coupled to the strobe circuit means for qualifying a locator strobe of the continuous locator strobes generated by the strobe circuit means in response to a selected valid succession of locator strobes taken from successive lines of the respective coarse locators.

2. The circuit of claim 1 further including;
   locator window generating means integral with the strobe circuit means and responsive to the qualifying circuit means for providing a respective locator time window to identify the successive scans of the white-to-black transition of each coarse locator.

3. The circuit of claim 2 wherein the strobe circuit means include;
   strobe threshold means for generating selected positive and negative strobe thresholds of selected pulse durations within which the succession of continuous locator strobes occur.

4. The circuit of claim 3 wherein the strobe and qualifying circuit means include;
   pulse former means for supplying the continuous locator strobes in response to the threshold means; and
   qualifier gate means coupled to the pulse former means for initiating the qualified locator strobe in response to the qualifying circuit means detecting the selected valid succession of locator strobes on successive lines of the respective coarse locator.

5. The circuit of claim 4 wherein the strobe circuit means include;
   subtractor means coupled to the positive threshold means for providing a difference pulse of selected time duration; and
   strobe threshold window generating means coupled to the subtractor means and thence to the pulse former means.

6. The circuit of claim 3 further including;
   checker circuit means integral with the strobe circuit means for generating a checker valid output indicative of checker white-to-black transitions in the optical test pattern.

7. The circuit of claim 6 wherein the checker circuit means include;
   positive and negative checker threshold comparators responsive to the beam scan of the bands of checker blocks; and
   flip-flop means coupled to the checker threshold comparators for generating an output state indicative of the valid scan of checker blocks.

8. The circuit of claim 7 wherein the qualifying circuit means include;
   strobe gating means coupled to the pulse former means and responsive to the succession of continuous locator strobes within the field to generate corresponding multiple write pulses; and
   temporary memory means for storing a selected binary word representing successive locator strobes on successive lines of the respective coarse locators in response to the corresponding multiple write pulses generated via the selected valid succession of locator strobes within each locator time window.

9. The circuit of claim 8 wherein the beam scan supplies an input video signal corresponding to the pattern configurations of the optical test pattern to the strobe threshold means and the checker threshold comparators; and the circuit includes timing/control signals selectively coupled to the input video signal for controlling the qualifying, strobe and checker circuit means, and including address means coupled to the temporary memory means and to the strobe gating means for supplying the location of each locator time window address in response to the location of the scanning beam.

10. The circuit of claim 9 further including;
pseudo strobe generating means responsive to the address means for generating a pseudo strobe signal corresponding to a selected locator window time and indicative of the absence of a qualified locator strobe within the respective locator time window.

* * * * *